Dec. 26, 1939.　　C. B. MOORE ET AL　　2,184,430
MEASURING INSTRUMENT
Filed Feb. 10, 1938　　5 Sheets-Sheet 1

INVENTOR.
COLEMAN B. MOORE
AUGUST C. JAUSS
BY
ATTORNEY

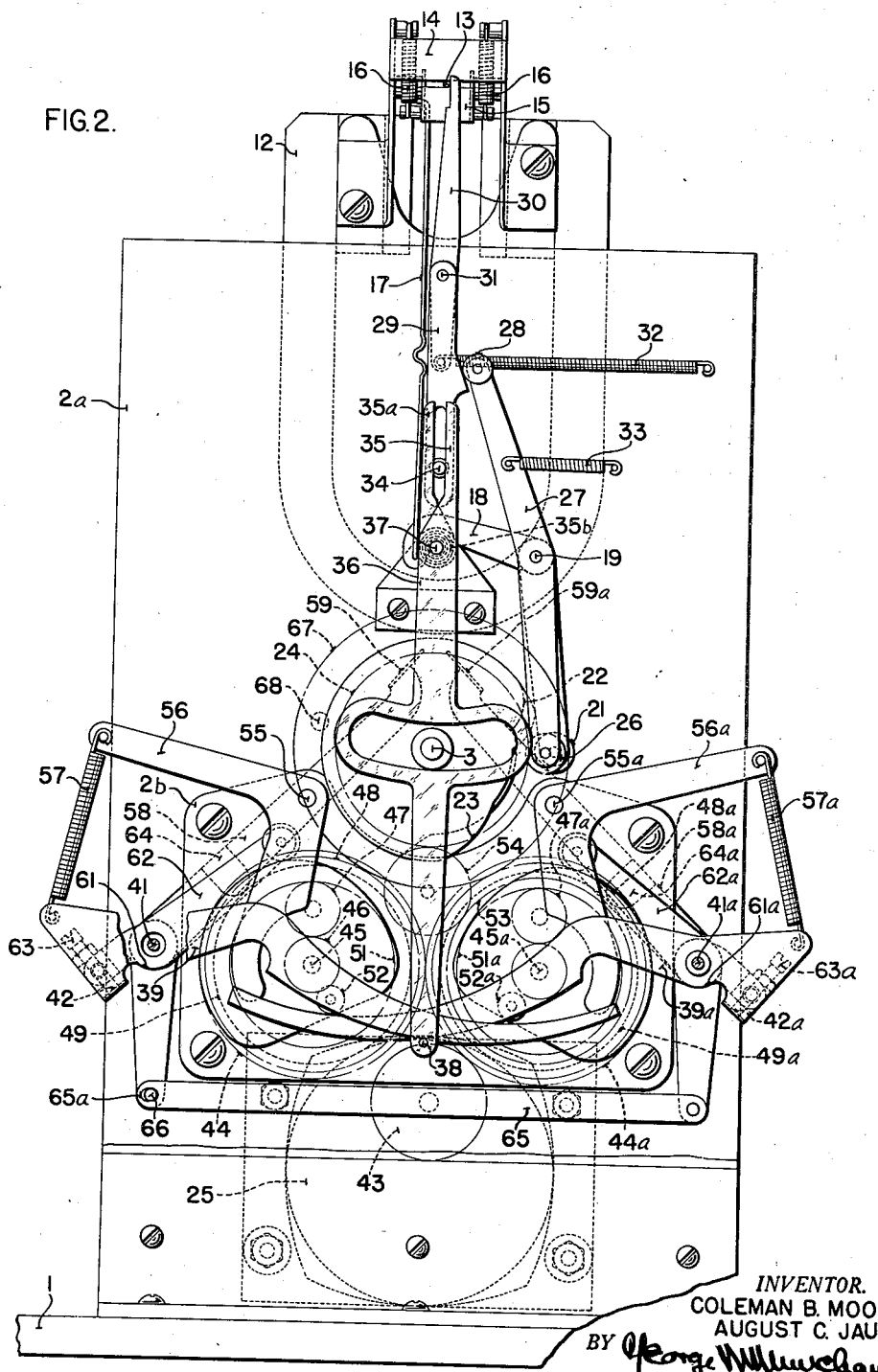

Dec. 26, 1939.  C. B. MOORE ET AL  2,184,430
MEASURING INSTRUMENT
Filed Feb. 10, 1938  5 Sheets-Sheet 3
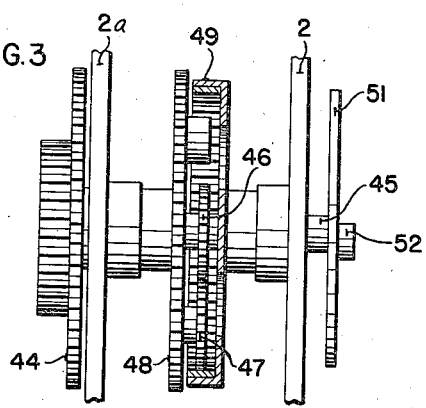
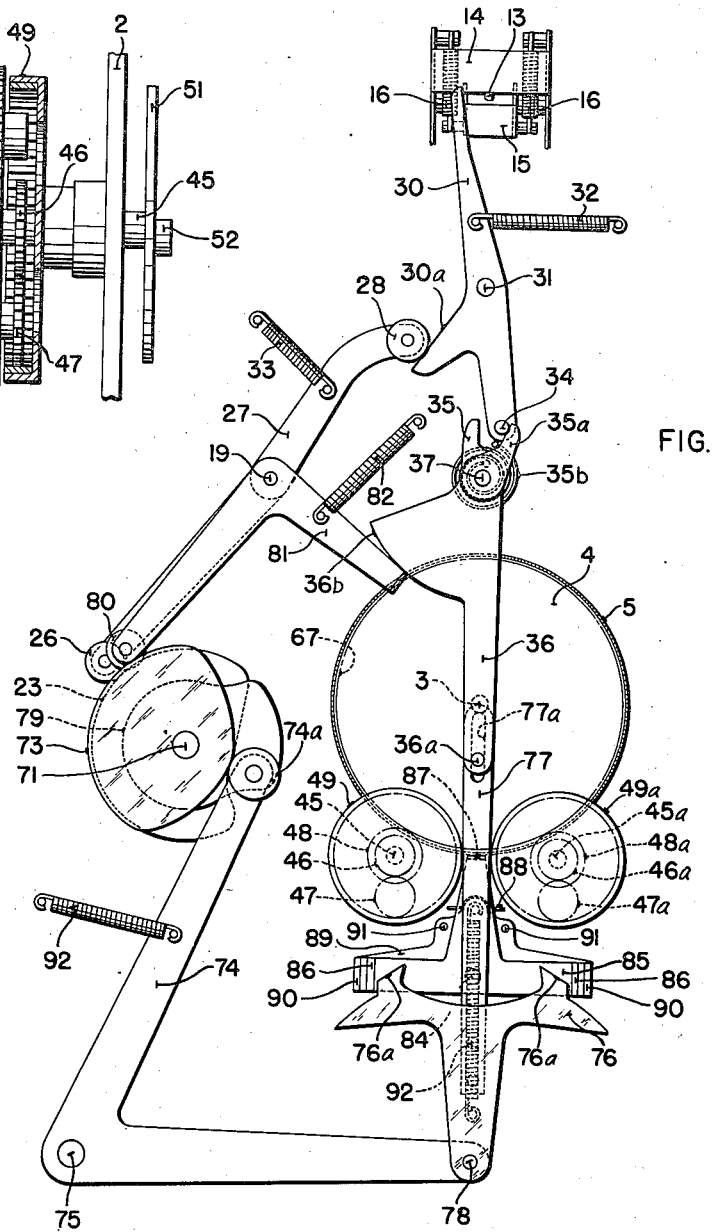
INVENTOR.
COLEMAN B. MOORE
AUGUST C. JAUSS
BY
ATTORNEY

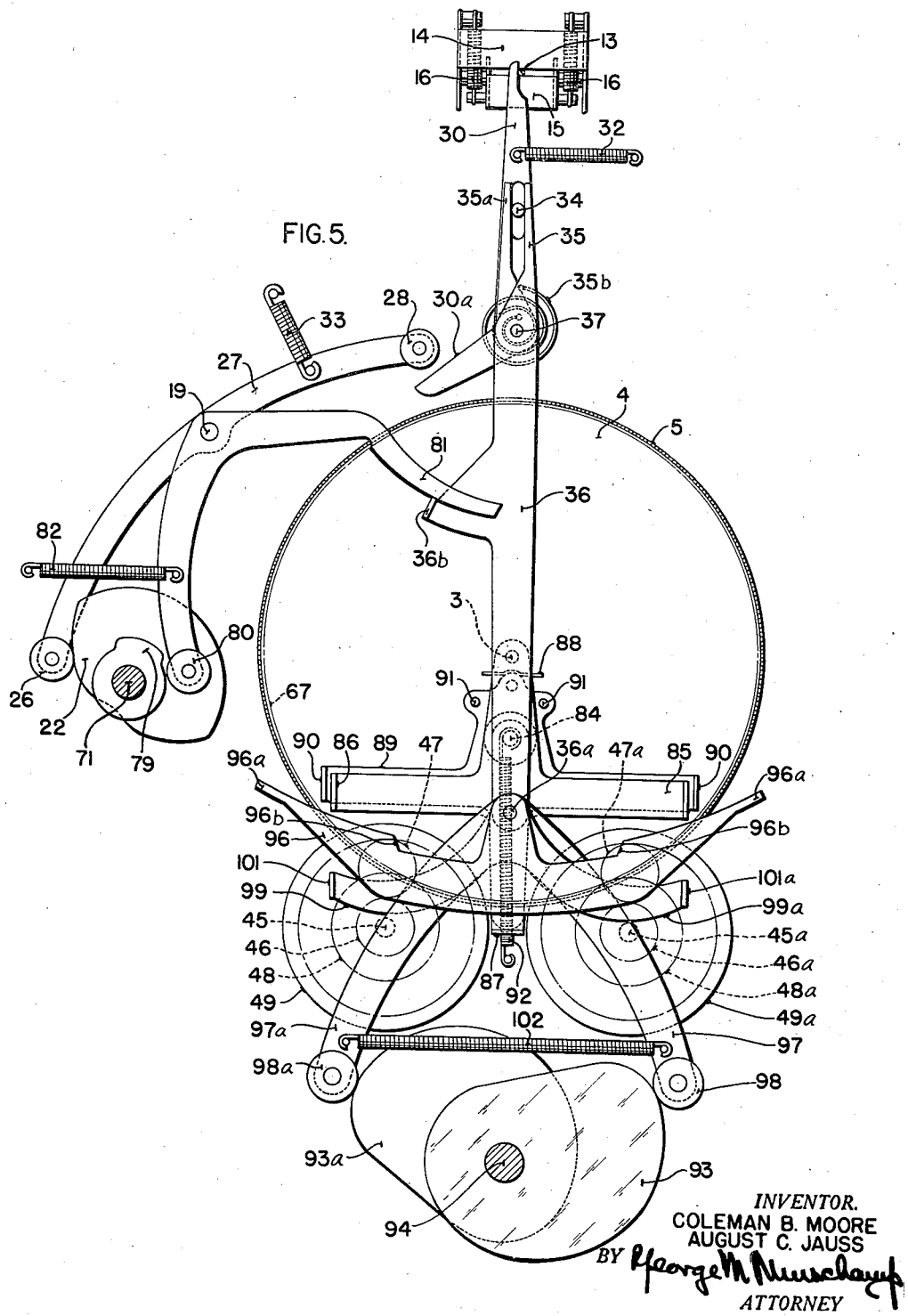

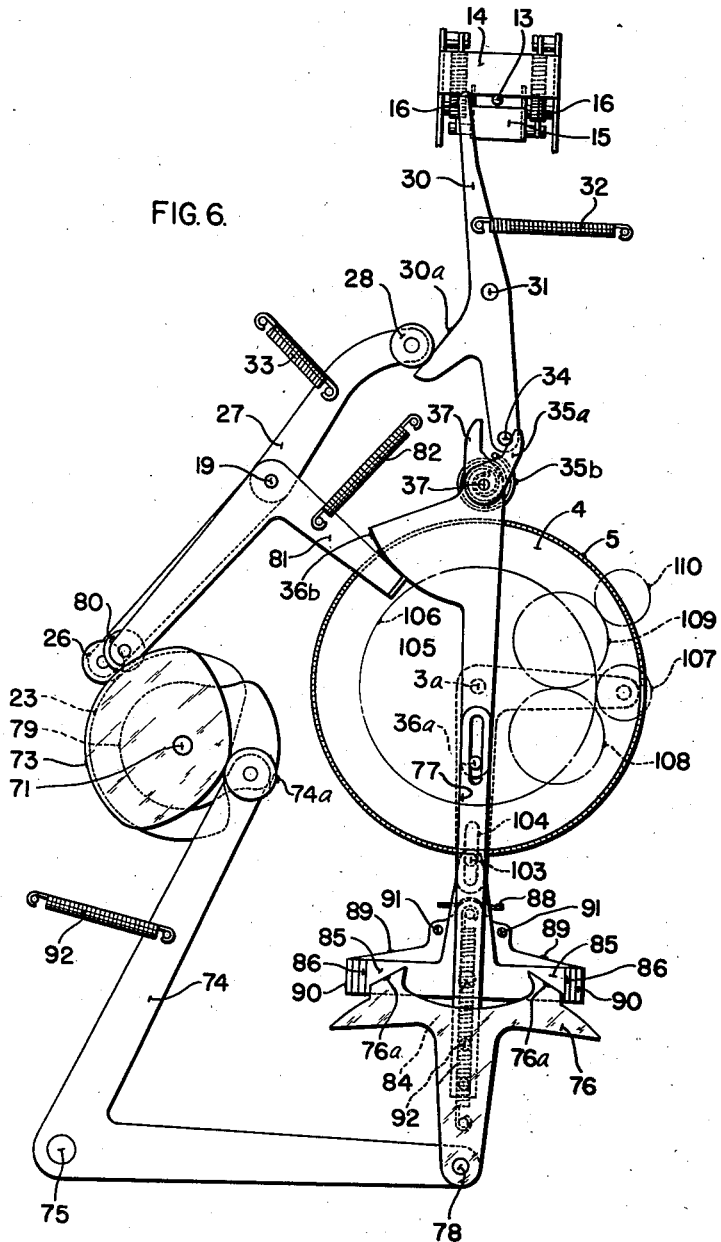

Patented Dec. 26, 1939

2,184,430

UNITED STATES PATENT OFFICE 2,184,430

MEASURING INSTRUMENT

Coleman B. Moore, Carroll Park, and August C. Jauss, Aldan, Pa., assignors to The Brown Instrument Company, Philadelphia, Pa., a corporation of Pennsylvania Application February 10, 1938, Serial No. 189,804

17 Claims. (Cl. 74—1)

Our present invention relates to measuring instruments, and particularly to measuring instruments of the self-balancing potentiometric type which may be used to adjust a member according to the varying values of a measurable potential difference, such as the voltage of a thermocouple responsive to a variable temperature.

The general object of our invention is to provide an instrument of the above-mentioned type, which is reliable and accurate in operation and which includes means to adjust a potentiometer slide-wire in a direction and amount in proportion to the deviation of a galvanometer pointer, the coil of which may be in circuit with a thermocouple.

The improvements in the present invention were especially devised to provide a smooth and accurate adjustment of the potentiometer slide-wire that is in accordance with time rather than in accordance with distance. This provides for adjustment during a predetermined time for any given amount of deviation of the pointer.

The various features of novelty which characterize our invention are pointed out with particularity in the claims annexed to and forming a part of this specification. For a better understanding of the invention, however, its advantages and specific objects obtained with its use, reference should be had to the accompanying drawings and descriptive matter in which we have illustrated and described a preferred embodiment of the invention.

Of the drawings:

Fig. 2 is a view similar to Fig. 1 with the front plate and slide-wire removed for the sake of clearness;

Fig. 3 is a section through one of the differentials;

Fig. 4 is a front view of a modification with certain parts omitted for the sake of clearness;

Figs. 5 and 6 are further front views of other modifications with parts omitted for the sake of clearness.

Figure 1:
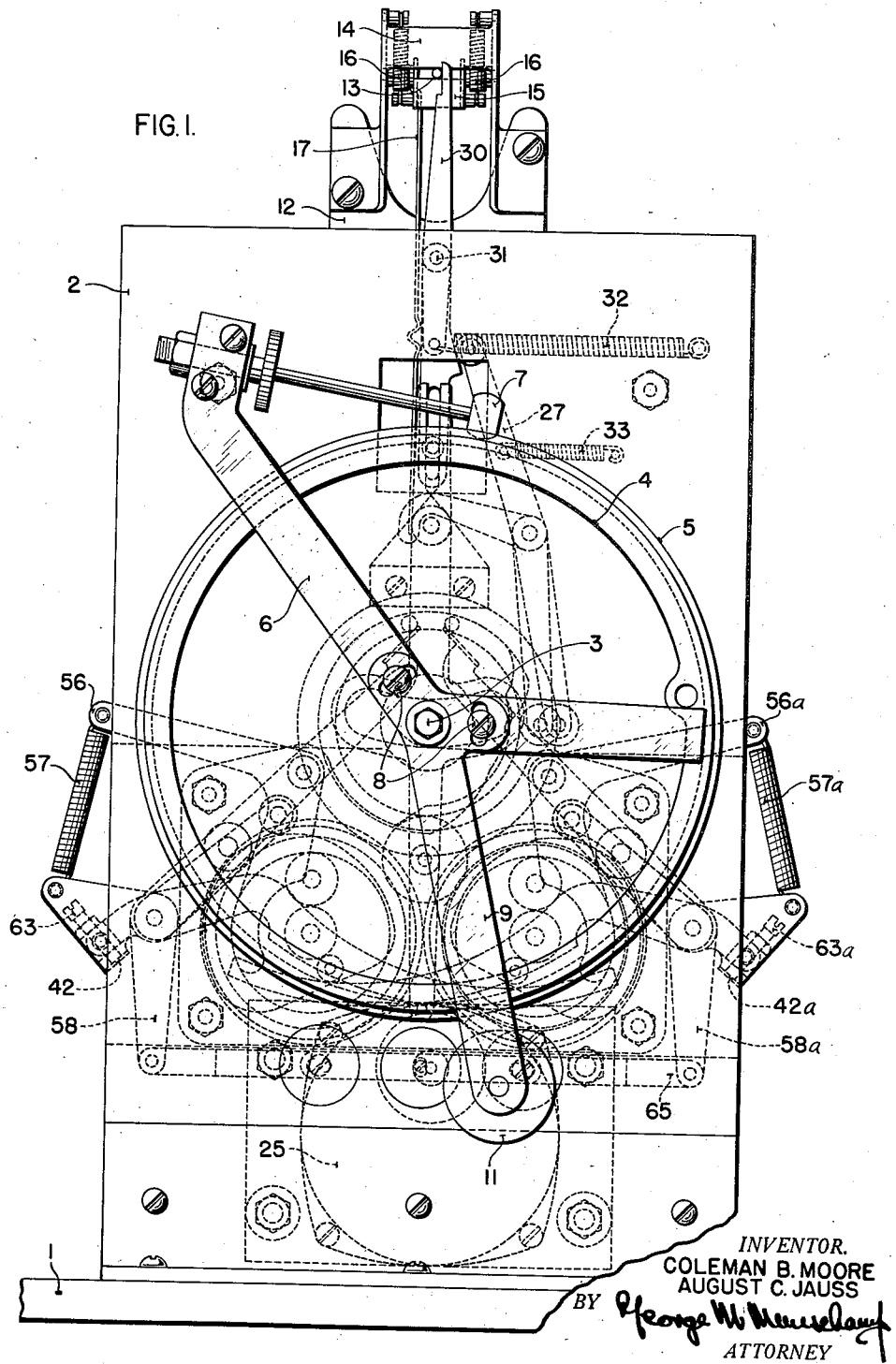
Fig. 1 is a front view of a potentiometer slide-wire adjusting mechanism.

In the modification of Figs. 1–3, the position of a moving element such as a galvanometer pointer is periodically measured by a feeler which in turn positions a secondary feeler in accordance with the position of the pointer. The position of the secondary feeler controls the application of a brake to the normally rotating parts of either one of a pair of differentials while the normally stationary part of each differential is geared to a potentiometer slide-wire contact. The differentials are driven in opposite directions so that the slide-wire contact will be driven thereby in one direction or the other depending upon the position of the galvanometer pointer and the secondary feeler when a brake is applied to a normally rotating part thereof. The distance of the pointer from its mid-position is also used to control the amount of movement of the slide-wire contact by varying the time that the brake is applied to the differential.

Potentiometric circuits of the type contemplated herein are well known, such, for example, as disclosed in the Harrison Patent 1,898,124, and include a known source of voltage impressed across a resistor, commonly termed the instrument slide-wire, the galvanometer and source of variable voltage being connected in series to oppose the known voltage across a variable portion of said resistor. When the variable voltage, for a given adjustment of the slide-wire, is equal and opposite to the known voltage, the galvanometer is in its null position, but on an increase above or decrease below the known voltage of the unknown voltage, the galvanometer will be deflected in one direction or the other respectively proportionately to the magnitude of the increase or decrease. This invention is concerned with the means by which deflections of said galvanometer control slide-wire adjustments to continuously rebalance the potentiometer system.

Mounted upon standard 1 are the two supporting plates 2, 2a, for the mechanism to be described. Journaled in the plates 2, 2a is a shaft 3 which extends through plates 2 and 2a and is journaled therein. Attached to the front of this shaft is a member 6 upon the upper end of which is adjustably mounted a slide-wire contactor 7. Adjustably fastened to the member 6 by screw 8 is a lever 9 having a counter-weight 11 on its lower end in order to balance the contact 7 as it rotates with the shaft 3 in a manner to be described. Attached to the front of plate 2, co-axial with shaft 3, is potentiometer slide-wire support 4 upon the surface of which is mounted a slide-wire 5. As the shaft 3 rotates, it will move contact 7 around the surface of the slide-wire and thereby adjust the setting of the galvanometer.

Fastened to the back supporting plate 2a is a galvanometer 12 which is used to record small currents coming from any desired type of primary element, such as a thermocouple. As small currents flow through the coil of the galvanometer, the pointer 13 is deflected to one side or the other of the neutral point where it is then clamped between stationary member 14 and movable member 15 which is biased toward 14 by springs 16. The means for moving member 15 downwardly to free the pointer consists of a link 17 (see Fig. 2) fastened at its upper end to member 15 and at its lower end to one arm of a bell-crank 18 pivoted on shaft 19 and having on its other arm a roller 21 which is acted upon by a cam 22, which along with a cam 23 and a gear 24 is mounted for rotation on shaft 3. The gear 24 and the two cams are driven through a train of gearing from a motor 25, fastened between plates 2 and 2a.

Also pivoted on shaft 19 is a lever 27 having on its lower end a roller 26 bearing against cam 23 under the bias of spring 33. The upper end of lever 27 carries a roller 28, which at times acts on a cam edge of member 29 to force that member to the left around its pivot 31 to which it is attached. A feeler 30 adapted to engage and measure the position of pointer 13 is also attached to pivot shaft 31 and is biased, along with lever 29, in a counter-clockwise direction by spring 32. The arrangement of cams 22 and 23 is such that in their rotation, the low portion of cam 22 will come under roller 21 and thereby permit bellcrank 18 to turn under the pull of springs 16 on member 15 to clamp the pointer 13 in position just prior to the time the low portion of cam 23 comes under roller 26. When this occurs, lever 27 is moved clockwise under the bias of spring 33, and the feeler 30 and lever 29 are moved counterclockwise under the bias of spring 32 until feeler 30 engages the end of pointer 13, which is now clamped in position. Continued rotation of cams 22 and 23 will move feeler 30 away from pointer 13 before the pointer is unclamped.

As the feeler 30 moves into engagement with pointer 13, a secondary feeler will be positioned in accordance therewith. To this end, the lower end of lever 29 is provided with a slot in which is adjustably positioned a pin 34. Each side of this pin is embraced by a finger 35 or 35a of a secondary feeler 36 that is pivoted at 37. Movement of pin 34 on lever 29 will accordingly move the secondary feeler and a pin 38 on the lower end thereof a corresponding amount. Inasmuch as the feeler 30 is to be moved to its inactive position during the ensuing operations, the finger 35a is separate from finger 35 and secondary feeler 36 and is biased toward finger 35 by spring 35b. In this manner the secondary feeler can be retained in its position while feeler 30 is moved, since finger 35a will give with respect to finger 35. The finger 35a mainly serves the purpose of preventing over-travel of secondary feeler 36.

The position of pin 38 is used to determine the relative positions of a pair of feeler cams 39 and 39a that in turn determine the length of the time that a brake is applied to the normally rotating member of a differential. Each cam 39 and 39a is provided with an inturned edge 42 or 42a and is pivoted to move around shaft 41 or 41a, respectively.

The above-mentioned differentials are of the planetary type and are mounted, one on each shaft 45 and 45a. Since each differential and the parts relating thereto are identical, only one will be described, corresponding parts of the other being designated with the same reference character and the suffix a.

As shown more clearly in Fig. 2, the shaft 45 has thereon a gear 44 which is in mesh with and driven by gear 44a on shaft 45a, which gear is in turn driven by a constantly rotating pinion 43 on the shaft of motor 25. The effect is that shafts 45 and 45a are driven in opposite directions to drive the differentials in opposite directions.

From Fig. 3 it will be seen that each differential consists of a pinion 46 on shaft 45 meshing with pinion 47, fastened to gear 48 which is rotatable around shaft 45. Also mounted for rotation on shaft 45 is an internal gear 49 having a smooth outer surface and having its teeth in mesh with pinion 47. It will be seen that since pinion 46 is constantly rotated, the power will tend to split two ways, to rotate gear 48 or to rotate gear 49 and will take the course of least resistance, as is true with all differentials. On the outer end of shaft 45 is a cam 51 having a roller 52 on the front thereof, and, in addition, the shaft 45a has in front of cam 51a a gear 53. The gear 53 drives an idler 54 which in turn drives gear 24 to which cams 22 and 23 are attached as above described.

The shaft 3 upon which the slide-wire contact 7 is mounted is adapted to be driven by either gear 48 or 48a by means of a gear 67 attached to that shaft and meshing with both gears 48 and 48a. This gear 67 with its attached slide-wire contact provides enough of a load on gears 48 and 48a to cause them to normally be stationary and therefore cause internal gears 49, 49a of the differentials to normally rotate.

Another and smaller supporting plate 2b is mounted between the plates 2 and 2a in a suitable manner and serves to locate stud shafts 55, 55a upon which are mounted brakes for the differentials and their actuating levers. The following parts are also duplicated on each side of the instrument, so they will only be described in detail with respect to one side. Rigidly fastened to shaft 55, back of plate 2b, is a member 58 whose end below and to the left of the shaft 55 is bent downwardly as shown. The upper end of this member 58 is formed as a stop 59 for pin 68 on gear 67, while between the shaft 55 and the lower end is a projection 64 that is adapted to bear on the outer surface of internal gear 49 of the differential and act as a brake therefor. A journal 61 is provided at the bend of this member 58 that loosely surrounds shaft 41, and pivoted on journal 61 is a cam follower 62 that has on one end a roller adapted to bear on the surface of cam 51 and on the other end an enlargement through which is threaded an adjusting screw 63 which at times bears upon edge 42 of feeler cam 39 to move that cam counterclockwise. The front of shaft 55 has rigidly attached to it a bell-crank 56, the outer end of which is joined to the outer end of feeler cam 39 by a spring 57, and the inner end of which has an arcuate portion that is acted upon by roller 52 on the front of cam 51 during its rotation. This lever at times serves to positively lift brake 64 from internal gear 49 of the differential. A link 65 having a slot 65a in one end is connected to the lower end of member 58a while the lower end of member 58 has a pin 66 extending into the slot to form a lost motion connection between the two.

The operation of the device is as follows: Cam 22 rotates in a clockwise direction until roller 21 reaches its low portion to let depressor bar 15 grip the pointer in its then position. At this time cam 23 has moved until its low portion permits lever 27 to move away from lever 29 so that feeler 30 can move under the bias of spring 32, into engagement with the pointer 13 to measure its position and thereby move secondary feeler 36 and pin 38 to a position dictated by the position of the pointer.

During the above operation cams 51 and 51a have been rotating counter-clockwise and clockwise respectively, and just as pin 38 is properly positioned, the low portions of these cams start to come under the rollers on levers 62 and 62a respectively, to lower the levers around journals 61 and through the adjusting screws 63, 63a permit the feeler cams 39 and 39a to be lowered toward pin 38. If this pin is not in its mid-position, one of the feeler cams will contact it before the other. If, for example, feeler cam 39 contacts pin 38 first, its downward movement will be arrested and edge 42 will become a fixed point. Continued rotation of cam 51 will then permit the roller on follower 62 to lower, with screw 63 on edge 42 as a fulcrum. This is possible since journal 61 around which follower 62 rotates is larger than shaft 41. As the follower 62 is lowered, the journal 61, part of lever 58, is also lowered under its counter-clockwise gravitational bias on shaft 55 until brake-member 64 engages the surface of the internal gear 49 to apply a braking force thereto. When the brake 64 engages the surface of internal gear 49, the line of least resistance for the differential is to cause pinion 47 to walk around the inside of gear 49 and thus rotate gear 48 and gear 67 on shaft 3 to rotate that shaft and the slide-wide contact 7. As lever 58 carrying journal 61 moves in a counter-clockwise direction to apply the brake 64 to gear 49, the pin 66 on the lower end of the lever is moved to the right end of slot 65a.

While the above-described operation is occurring, the feeler cam 39a is moving toward pin 38. When feeler cam 39a engages pin 38 the above operation takes place through its corresponding lever system, except that when the member 58a moves clockwise under its gravitational bias to apply brake 64a to internal gear 49a, the right end of slot 65a will move pin 66 to the left thus removing brake 64 from gear 49a. The action of springs 57 and 57a balance each other, and as neither brake 64 is bearing in its gear 49, movement of shaft 3 and slide-wire contact 7 is arrested. Thus it will be seen that shaft 3 and the contact 7 will be driven for a period of time equal to that which it takes feeler cam 39a to contact pin 38 after feeler cam 39 has contacted it.

In order to prevent rotation of shaft 3 during the rising of feeler cams 39 to their initial positions, the rollers 52 will come under the arcuate portions of bellcrank levers 65 just as the high portions of the cams 51 are starting under followers 62 to raise the feeler cams 39 and free pin 38. As rollers 52 come under the arcuate portions of the bell-cranks 65 they force the bell-cranks, shafts 55 to which they are attached, and members 58 which are also fastened to shafts 55 to move counter-clockwise (member 58a) and clockwise (member 58) for an extent limited by pin 66 and slot 65a to hold brake-members 64 out of engagement with gears 49. By the time that feeler cams 39 and 39a have reached the top of their strokes and start down, a new setting of the feelers 30 and 36 has taken place to start a new cycle.

If feeler cam 39a strikes pin 38 first, the reverse of the above operation is true and projection 64a will brake internal gear 49a. If both feeler cams 39, 39a contact pin 38 at the same time, indicating a neutral position of the galvanometer pointer, neither of the brakes 64 or 64a will be applied to their respective gears and the slide-wire contact will not be rotated.

The modification disclosed in Fig. 4 performs its slide-wire adjusting operations by braking the normally moving member of either one of two oppositely driven differentials as was done in Fig. 1, but differs therefrom in the manner of setting the feelers from the position of the galvanometer pointer and in the manner in which the brake is applied to the differentials. In this modification there is also provided a means for giving a continuous correcting movement to the slide-wire in the event of an excessive galvanometer deflection.

The pointer is clamped in its position in a manner previously described in connection with Fig. 1 by members 14 and 15. When this occurs the feeler 30 is permitted to move into engagement therewith by the recession of roller 28 from a cam edge 30a thereon, as the low portion of cam 23 comes under roller 26 on the lower end of lever 27. As the feeler 30 moves toward pointer 13, the pin 34 on its lower end bears against finger 35 on secondary feeler 36 to properly position that member in accordance with the position of the pointer. A brake 81 in the form of a bell-crank is provided to hold the secondary feeler 36 in place during the remainder of the operating cycle, and does so by engaging a brake edge 36b thereon. This brake is applied by spring 82 and released by engagement between a roller 80 and a cam 79 that is mounted on a shaft 71 along with and in timed relation to cam 23 that controls feeler 30.

Movement of secondary feeler 36 is transmitted to an actuating member 76 by means of a pin 36a on its lower end acting against the sides of a slot 77a in an arm 77 that is rigidly attached to member 76. The actuating member 76 is supported by and pivots around a pin 78 on the horizontally extending arm of a bell-crank 74 that is in turn mounted for pivoted movement around point 75. Movement is imparted to the bell-crank 74 and actuating member 76 in a counter-clockwise direction by a spring 92 and in a clockwise direction against the force of this spring by a cam 73 that is also mounted on shaft 71 in timed relation to the other cams thereon.

A brake-member 85 for the differentials is pivoted on the frame of the device at 84 and has two forwardly bent edges 86, one on each end, that overlie inclined edges 76a of the actuating member 76. Above the pivot 84 of the brake-member is an edge 87 that is adapted to engage the surface of either internal gear 49 of the differentials. A means 89 for holding the edge 87 in continuous engagement with one of the gears 49 or 49a in the event of an excessive galvanometer deflection is also pivoted at 84 back of the brake-member. The upper end of member 89 is normally held in place by a leaf spring 88 on the brake-member against the toggle action of a spring 92 that has its lower end fastened to a stationary part of the device. This member 89 has two forwardly bent edges 90 that are parallel to and outside of edges 86, and has two pins 91 that are adapted to engage against the sides of the brake-member 85 to force its edge 87 against one of the gears 49 of the differentials.

When the above-described positioning operations of feeler 30 and secondary feeler 36 take place, the high portion of cam 73 is under roller 74a and member 76 is positioned downwardly from the position shown, so that, as it is moved to one side or the other according to the position of the pointer, the edges 76a will not strike the edges 86. As cam 73 rotates to bring its low portion under roller 74a, spring 92 will rotate the bell-crank 74 counter-clockwise around pivot 75 to move actuating member 76 upwardly. If the pointer was in its mid-position the parts will assume the position shown and on its upward movement neither edge 76a will engage its corresponding edge 86. If, however, the pointer 13 is to one side of its mid-position, member 76 will be moved out of the vertical an amount depending upon this deviation, and on its upward movement an edge 76a will engage an edge 86 to tilt the brake-member 85 around 84 and move edge 87 into engagement with one of the internal gears 49 or 49a. As one of gears 49 or 49a is stopped rotating, the corresponding gear 48 or 48a will be rotated to rotate gear 67 and drive the slide-wire. The direction of rotation of the slide-wire will therefore depend upon the direction of deviation of the pointer 13 and the length of time it is rotated will depend upon the length of time an edge 76a is in engagement with an edge 86. Since cam 73 is rotating at a constant speed, this time will vary with the amount of deflection of pointer 13 because the more member 76 is moved out of the vertical, the sooner one of its sloping edges 76a will engage the corresponding edge 86.

If the galvanometer pointer should deflect an excessive amount to either side, the actuating member 76 will be moved by pin 36a around its pivot 78 to such an extent that the inner end of one of the edges 76a will be beyond an edge 86 and will underlie an edge 90. Upon the subsequent upward movement of member 76 by bell-crank 74, edge 90 will be engaged to move the upper end of member 89 out from under spring 88 and spring 92 will then toggle this member over until a pin 91 engages the side of brake-member 85 to bring edge 87 against the surface of one of gears 49 or 49a. The braking of gear 49 or 49a will cause, through its differential, a continuous movement of slide-wire contact 7 until the following cycle or until the deflection of pointer 13 causes movement of the member 76 to a position where the member 89 toggles into neutral position with its upper end under spring 88, thereby relieving the brake.

The modification shown in Fig. 5 is similar to that disclosed in Fig. 4, but differs therefrom in the manner of setting the lever 36 and in the manner of applying the brake to the internal gears 49 and 49a of the differentials. In this modification the feeler 30 is pivoted around the pin 37 upon which the secondary feeler 36 is also pivoted, and the pin 34 is adjustably mounted in a slot near the lower end of the feeler.

An actuating member 96 having surfaces 96a and 96b which engage the edges 86 or 90 depending upon the amount of deflection of the pointer is pivoted at 36a on the lower end of secondary feeler 36. Also pivoted about an axis that is coaxial with and behind point 36a, when 36a is in its neutral position, are two curved actuating levers 97, 97a having on one end rollers 98, 98a and having the other ends 99, 99a curved backwardly as shown so that the edges 101, 101a thereon can contact the lower edge of member 96. The lower ends of the levers 97, 97a are biased towards each other by a spring 102, and the rollers 98 and 98a are therefore held in contact with cams 93 and 93a respectively, which cams are mounted on shaft 94 that is connected by gearing (not shown) with shaft 71 and shafts 45 and 45a of the differentials. All of these shafts are driven in the proper timed relation by a motor similar to motor 25 of Fig. 1.

In its operation, this modification has the feeler 30 moved up against pointer 13 to adjust lever 36 and has brake 81 applied to edge 36b in a manner identical to that described in detail in connection with Fig. 4. As lever 36 is adjusted the actuating member 96 is moved to the right or the left, depending upon the position of the pointer 13. The parts are shown in the drawings in the position just after the setting has been compleetd for a neutral position of the galvanometer. Continued rotation of shaft 71 will leave the low portions of cam 79 under roller 80 and will bring the high portion of cam 22 under roller 26 to move feeler 30 to its inactive position for the rest of the cycle. Finger 35a will give with respect to finger 35 under the tension of spring 37 to permit this to occur. Due to the gearing between shafts 71 and 94, the low portions of cams 93 and 93a will start to come under rollers 98, 98a so that spring 102 can pull the lower ends of levers 97, 97a toward each other just after the high portion of cam 22 comes under roller 26. In the setting shown, that is mid-position, edges 101, 101a will engage the lower edge of member 96 simultaneously so that there will be no tilting of 96 and no contact between either edge 96a and either edge 86, and, therefore, member 85 will not be tilted so that there will be no braking action on either of the internal gears 49 or 49a.

If, however, member 96 has been adjusted, say to the left, edge 101 will strike the lower edge of 96 and force the left-hand edge 96a into contact with the left-hand part 86 to tilt brake-member 85 in a clockwise direction around its pivot 84 and apply the brake-member 87 to the surface of internal gear 49. This, because of the differential construction described above, will cause gear 48 to rotate gear 67 and the slide-wire. If member 69 had been moved to the right, in a like manner the brake would have been applied to gear 49a. The braking action continues until edge 101a comes into contact with the other side of member 96 and moves that member back into a level position to stop the braking action. The cycle of operation is completed when members 97, 97a move back to the shown positions. If during the operation of the device there is an abnormally large deflection of the galvanometer, member 96 will be moved sufficiently so that one of the edges 96b will be brought under one of the edges 90. Therefore, when member 96 is contacted by either edge 101 or edge 101a, the upper end of member 89 is moved out from under spring 88 and member 89 is toggled over by the action of spring 92, and one or the other of pins 91 will contact brake-member 85 to lock it in position. This condition will exist continuously through the cycles until the galvanometer deflection bring members 36 and 96 back to a position where member 89 toggles into neutral position and is held by spring 88, thus relieving the brake. By differentially operating the brake through member 96, the effect of wear is eliminated since both sides of 96 and both edges 101, 101a are worn approximately an equal amount.

The modification of Fig. 6 is the same as that shown in Fig. 4 in all respects but the drive to the slide-wire. Whereas in Fig. 4 the slide-wire was driven by differentials, here it is driven by bringing a pinion, geared to the slide-wire, into mesh with one or the other of a pair of oppositely rotating gears.

The member 85, instead of having an edge 87 to brake a differential, has a rearwardly extending pin 103 on its upper end. This pin 103 extends through a slot 104 formed in the lower end of one arm of a bell-crank 105 that is mounted to move around shaft 3, to the rear of the slide-wire support 4. A wide-faced pinion 107 is mounted on the end of the horizontal arm of bell-crank 105 and is at all times in mesh with a gear 106 attached to the slide-wire support 4. The pinion 107 is adapted to also be meshed with either one of gears 108 or 109 that are constantly rotated by gear 110, which is driven from some source of power such as motor 25 that drives cam shaft 71.

In the operation of this modification, as in that of Fig. 4, if the pointer 13 is in its midposition, neither of the edges 76a of actuating member 76 will engage an edge 86 as that member is moved upwardly by bell-crank 74. If, however, the pointer has deflected to one side or the other, one of the edges 76a will engage one of the edges 86 on its upward movement and thereby tilt member 85. As this occurs, the pin 103 acting in slot 104 will move bell-crank 105 sufficiently to bring pinion 107 into mesh with one of the gears 108 or 109, and thereby rotate the slide-wire in the proper direction, depending upon the deflection of the galvanometer pointer 13.

From the above-detailed description of the various modifications of our invention, it will be seen that we have provided a means for accurately adjusting a potentiometer slide-wire in accordance with the deviation of a galvanometer pointer. The adjustment is according to time rather than according to distance, since adjustment is taking place during a certain length of time in each cycle rather than during the movement of a member. By this we mean that for a given deviation of the galvanometer pointer, the slide-wire or slide-wire contact will be rotated a given amount of time from one of the constantly rotating members. This is an important feature since the amount of movement of the slide-wire contact during a predetermined time can be regulated to properly control some condition or process at a specified proper rate.

While in accordance with the provisions of the statutes, we have illustrated and described the best form of our invention now known to us, it will be apparent to those skilled in the art that changes may be made in the form of the apparatus disclosed without departing from the spirit of our invention as set forth in the appended claims, and that certain features of our invention may sometimes be used to advantage without a corresponding use of other features.

We claim:

1. In a measuring instrument, a pointer deflected in accordance with a variable condition, means for clamping said pointer in position, a feeler adapted to move into contact with said pointer, a movable member positioned in accordance with the position of said feeler, means for moving said member, two oppositely rotating drive members, a mechanism adapted to be adjusted by said drive members, and means controlled by the movement of said member for effecting an adjustment of said mechanism by one of said drive members.

2. In a measuring instrument, a pointer movable in accordance with a measurable condition, means for clamping said pointer, a feeler adapted to contact said pointer while it is clamped, a member movable in accordance with the position of said feeler, an adjustable mechanism, means for adjusting said mechanism for a time dependent upon the position of the pointer, said means consisting of a pair of oppositely rotatable drive members, and means for driving the mechanism by one of said drive members, said means being actuated by movement of said member.

3. In a measuring instrument, a pointer movable in accordance with a measurable condition, means for clamping said pointer in position, a feeler for contacting said pointer while clamped, a member positioned by said feeler, an adjustable mechanism, a differential consisting of a normally stationary part in driving relation with the mechanism and a normally rotatable part, a brake for the normally rotatable part, and means controlled by the position of said member to brake the normally rotatable part and thereby through the differential cause the normally stationary part to rotate and adjust said mechanism.

4. In a measuring instrument, a pointer movable in accordance with a measurable condition, means for clamping said pointer in place, a feeler positioned in accordance with the position of said pointer, a member positioned by said feeler, an adjustable mechanism, a drive member therefor, a tiltable element controlling said drive member when it is tilted, means for moving said member into engagement with said element to tilt it and thereby make it control the drive member to adjust said mechanism.

5. In a measuring instrument, a pointer movable in accordance with a measurable condition, a feeler adapted to engage said pointer, a member positioned by said feeler, two oppositely rotating gears, a pinion adapted to engage either one of said gears, a tiltable element upon which said pinion is mounted, a periodically operated means to move said member after it is positioned, means operated by movement of said member to tilt said element and mesh said pinion with one of said gears, and an adjustable mechanism operated by said pinion.

6. In a measuring instrument, a pointer movable in accordance with a measurable condition, a feeler adapted to engage said pointer, a member positioned by said feeler, two oppositely rotating gears, a pinion adapted to engage either one of said gears, a tiltable element upon which said pinion is mounted, a cam for moving said member into and out of engagement with said element, the part of said member engaging said element tilting the element and thereby moving the pinion into engagement with one of said gears, an adjustable mechanism, and means operated by said pinion to adjust said mechanism in accordance with the direction of its rotation.

7. In a measuring instrument, a pointer movable to either side of a neutral position in accordance with a measurable condition, a feeler for contacting said pointer, a member positioned on either side of a neutral position by said feeler in accordance with the position of the pointer, two oppositely rotatable gears, a pinion adapted to mesh with either gear and mounted upon a tiltable element, means for moving said member, one part of said member engaging said element if it is on one side of neutral to tilt the element one way, another part of said member engaging said element if the member is on the other side of neutral to tilt the element the other way to thereby cause the pinion to mesh with one or the other of said gears, and an adjustable mechanism driven by said pinion in accordance with its direction of rotation.

8. In a measuring instrument, a pointer movable on either side of a neutral position in accordance with a measurable condition, a feeler contacting with said pointer, a member positioned in accordance with the position of said feeler and pointer, two oppositely rotating differentials each consisting of a pair of alternately moving parts, one of which is normally rotating and the other of which is normally stationary, means actuated in accordance with the position of said member to brake one of said normally rotating parts, an adjustable mechanism, and means to adjust said mechanism from the normally stationary part which rotates when its corresponding rotating part is braked.

9. In a measuring instrument, a rotatable mechanism, a gear for rotating the mechanism, means for rotating said gear consisting of oppositely rotating drive members, a pointer movable in accordance with a measurable condition, a member moved to a position corresponding to the position of the pointer, means for causing one of said drive members to drive said gear, said means being controlled by said member.

10. In a measuring instrument, a pair of oppositely rotating differentials each consisting of a normally rotating part and a normally stationary part, an adjustable mechanism, means to change the setting of the mechanism driven by either of the normally stationary parts, a brake to act on either rotating part and thereby rotate the normally stationary part, through the differential to change the setting of the mechanism, a movable pointer, and means to move the brake into engagement with one of the normally rotatable parts in accordance with the position of the pointer.

11. In a measuring instrument, a pointer deflectable in accordance with a measurable condition, a feeler adapted to engage said pointer, a member moved by said feeler to a position corresponding to that of said pointer, means for thereafter moving said member through a predetermined path, an adjustable mechanism, a pair of oppositely rotating drive members for adjusting said mechanism, and means controlled by movement of said member through its path to adjust said mechanism by one of said drive members.

12. In a measuring instrument, a pointer movable in accordance with variations in a condition, a member, means to position said member to a position corresponding to that of said pointer, a pair of oppositely rotating drive members, a mechanism adapted to be adjusted thereby, means to move said member after it is positioned to establish a driving connection between one of said drive members and said mechanism.

13. In a measuring instrument, a pointer movable in accordance with variations in a condition, a feeler for contacting said pointer, a member positioned by said feeler, a pair of oppositely rotatable drive members, an adjustable mechanism, means for moving said member after it is positioned, and means controlled thereby to cause one of said drive members to adjust said mechanism.

14. In a measuring instrument, a pointer deflected in accordance with a measurable condition, means for periodically clamping said pointer in position, a feeler adapted to contact said pointer while clamped, a movable member positioned by and in accordance with said feeler, an adjustable mechanism, a pair of oppositely rotating drive members, means to move said member after it is positioned, and means controlled by the movement of said member to adjust said mechanism by one of said drive members.

15. In a measuring instrument, a pointer deflected in accordance with variations in a measurable condition to either side of a neutral position, a pair of oppositely rotating differentials, each consisting of a normally stationary part and a normally rotatable part, a support mechanically connected to each of the normally stationary parts, a member movable to a position corresponding to that of the pointer and brake means controlled by said member to stop one of said normally rotating parts to thereby start rotation of the corresponding normally stationary part and drive the support.

16. In a measuring instrument, a pointer deflectable in accordance with a measurable condition, a feeler, means to move said feeler into contact with said pointer, a secondary feeler positioned by said feeler, means for applying a brake to said secondary feeler and means to move said feeler away from said pointer, a member positioned by said secondary feeler in accordance with the position of said pointer, a mechanism, adjusting means therefor, and means movable in accordance with the position of said member to permit an adjustment of said mechanism by said adjusting means.

17. In a measuring instrument, a pointer deflectable in accordance with variations in a measurable condition, a feeler adapted to contact said pointer, a secondary feeler positioned by said feeler, a pair of cams adapted to engage said secondary feeler, a pair of oppositely rotating differentials each consisting of a normally stationary part and a normally rotating part, a brake for each rotating part, means to apply said brakes by movement of said cams, means to move said cams into engagement with said secondary feeler, the sequence of engagement depending upon the position of said secondary feeler, to apply one of said brakes to its normally rotating part so that the normally stationary part will be driven, an adjustable mechanism, and means to adjust said mechanism by rotation of said normally stationary part.

AUGUST C. JAUSS.
COLEMAN B. MOORE.